United States Patent Office 3,414,633
Patented Dec. 3, 1968

3,414,633
DIMERIZATION OF INTERNAL MONOOLEFINS
Paul R. Stapp, Bartlesville, Okla., assignor to Phillips Petroleum Company, a corporation of Delaware
No Drawing. Filed Jan. 10, 1966, Ser. No. 519,423
7 Claims. (Cl. 260—683.15)

ABSTRACT OF THE DISCLOSURE

Dimers of internal monoolefins are formed by contact with a catalyst formed by mixing at least one rare earth halide and yttrium halide with at least one alkali metal aluminum hydride.

---

This invention relates to a method for forming polymers, particularly dimers.

Heretofore, dimers of olefins useful for alkylating benzene in the production of synthetic detergents, for alkylating naphthalene to produce pour point depressants, and the like have been formed by various processes using mono-1-olefins.

It has now been found that dimers suitable for the above alkylations and other uses can be prepared from internal monoolefins, olefins having a double bond at least one carbon atom removed from the end carbon atom of the molecule, by contact with a catalyst formed on mixing at least one of rare earth halides and yttrium halide with at least one alkali metal aluminum hydride. It was unexpectedly found that the process of this invention can produce dimers identical to those produced by the dimerization of 1-olefins, e.g., 2-alkyl-1-alkenes.

Accordingly, an object of this invention is to provide a new and improved method for making dimers.

Other aspects, objects, and the several advantages of this invention will be apparent to those skilled in the art from the description and appended claims.

According to this invention, the catalyst is that obtained by mixing at least one rare earth chloride, bromide, or iodide, preferably chloride, and/or yttrium chloride, bromide, or iodide, preferably chloride, with an alkali metal aluminum hydride wherein the alkali metal is selected from the group consisting of lithium, sodium, potassium, rubidium, and cesium. The rare earth halides are halides of the metals of atomic numbers 57 through 71, inclusive. These include lanthanum, cerium, praseodymium, neodymium, promethium, samarium, europium, gadolinium, terbium, dysprosium, holmium, erbium, thulium, ytterbium, and lutetium. Yttrium, while not specifically a rare earth metal, is frequently classed with the rare earths because it is frequently found with the rare earths in nature and resembles the rare earths in chemical behavior.

Although any alkali metal aluminum hydrides such as sodium aluminum hydride, potassium aluminum hydride, rubidium aluminum hydride, and cesium aluminum hydride can be employed, lithium aluminum hydride is presently preferred. Also, cerium chloride is presently preferred and is also preferred to be used with lithium aluminum hydride. The mixing of the halide or halides with the alkali metal aluminum hydride or hydrides can be carried out in any conventional manner such as by simple dry or liquid blending, stirring, ball milling, and the like, preferably but not necessarily in the presence of an inert liquid medium such as paraffinic, cycloparaffinic, or aromatic hydrocarbons having from 3 to 12 carbon atoms per molecule, inclusive, and mixtures thereof. The mixing time and temperature can both vary widely but will generally be from about 1 minute to about 5 days, at a temperature from about 20° C. to about 300° C., preferably from about 20° C. to about 100° C. The catalyst can be prepared in situ in the reaction zone by separately adding the rare earth and/or yttrium components and the alkali metal aluminum hydride component thereto in the presence of or absence of the olefin feed. Generally, the mol ratio of rare earth and/or yttrium halide to the alkali metal aluminum hydride will vary from about 0.1/1 to about 10/1, preferably from about 0.25/1 to about 1/1.

The internal monoolefins useful in this invention are acyclic and can contain from 4 to 20, preferably 4 to 12, carbon atoms per molecule, inclusive. The monoolefins can be employed singularly or in combinations of two or more and can themselves be linear or branched if the branching is at least one, preferably 2, carbon atoms removed from the internal double bond. Examples of suitable internal monoolefins include butene-2, 4-methylpentene-2, hexene-3, 5 - ethylhexene - 2, octene-2, octene-4, 5,5 - dimethylnonene - 2, decene-3, dodecene-4, 3-methyl - 9 - ethyldodecene - 6, tridecene-5, 7,8,9 - trimethylpentadecene - 2, 2 - methylpentadecene - 3, eicosene-3, and the like and mixtures thereof. In addition to relatively pure olefin feed stocks, this invention can be applied to refinery or similar industrial streams containing substantial quantities, e.g., at least 10 volume percent, of such internal olefins.

According to this invention, the catalyst and olefin feed are contacted together in any conventional apparatus in the presence or absence of a diluent. A diluent is presently preferred and substantially any liquid inert to the catalyst can be employed, preferred liquids being those hydrocarbons used as a diluent for forming the catalyst above which include hexane, benzene, dodecane, and the like and mixtures thereof. Other suitable diluents include ethers having from 2 to 8 carbon atoms per molecule, inclusive, and trialkylamines having from 3 to 12 carbon atoms per molecule, inclusive. The time of contact between the catalyst and olefin feed can vary widely but will generally be in the range of from about 1 minute to about 50 hours, preferably from about 4 to about 30 hours. The reaction pressure can vary widely but will generally be that which is sufficient to maintain the reactants substantially in a liquid phase and can generally vary from about 100 to about 5000 p.s.i.g. The temperature of the conversion can also vary widely but will generally be that which is sufficient to effect dimerization and is preferably in the range of from about 200 to 350, more preferably 225 to 300° C. The amount of catalyst employed will generally be from about 0.01 to about 10 weight percent based on the amount of olefin to be dimerized.

Suitable catalysts include the catalyst formed by mixing cerous chloride and lithium aluminum hydride, the catalyst formed by mixing praseodymium bromide and sodium aluminum hydride, and the catalyst formed by mixing yttrium iodide and potassium aluminum hydride.

After completion of the reaction the dimer produced can be isolated from the reaction mixture by conventional methods such as solvent extraction, distillation, adsorption, crystallization, and the like.

EXAMPLE I

A catalyst was prepared by stirring 4.92 g. (20 mmoles) of cerous chloride and 3.04 g. (80 mmoles) of lithium aluminum hydride in 100 ml. of benzene at room temperature for a period of about 16 hours.

The catalyst was transferred to a 1-liter autoclave. A 500 ml. quantity of dry octene-2 was added and the autoclave was maintained with stirring at 250° C. for 20 hours. The autoclave was then cooled to room temperature, opened, and the resulting liquid product mixture was removed, dissolved in 200 ml. of ethyl ether, washed with 10 weight percent hydrochloric acid, washed again with water, and filtered. The almost water-clear filtrate was then fractionated to remove the ether, benzene, and unconverted octenes and to isolate the product. Distillation at 90–95° C. and at 0.5 mm. pressure gave 116.5 g. of dimer product.

The conversion of 2-octene was 50.6 percent and a 63 percent ultimate yield of dimer was obtained. About 50 g. of higher boiling residue material remained after the distillation.

The dimer product was identified by gas-liquid chromatography and infrared analysis as 2-hexyl-1-decene and its infrared spectrum was found essentially identical to that of a dimer that can be produced from octene-1.

EXAMPLE II

A catalyst was prepared by stirring 4.92 g. (20 mmoles) of cerous chloride and 3.04 g. (80 mmoles) of LiAlH$_4$ in 100 ml. of benzene at room temperature for about 16 hours.

The catalyst was transferred to a 1-liter autoclave. A 500 ml. (342 g.) quantity of a mixture of 2-hexenes and 3-hexenes (technical grade distilled from CaH$_2$) was added. The autoclave was sealed, and heated at 250° C. for 22 hours. The autoclave was cooled to room temperature, opened and the mixture was filtered. The liquid obtained from the filtration was distilled to isolate the product. A 105 g. quantity of product dimer was collected at 75–78° C. at 5 mm. pressure. Only a trace of residue remained after the distillation. The conversion of the mixed 2- and 3-hexenes was 31 percent and essentially a quantitative ultimate yield of dimer product was obtained.

The dimer product was identified by gas-liquid chromatography and infrared analysis as 2-butyl-1-octene and its infrared spectrum was found essentially identical to that of a dimer that can be prepared from hexene-1.

Reasonable variations and modifications are possible within the scope of this disclosure without departing from the spirit and scope thereof.

I claim:

1. A method for forming dimers from olefins comprising contacting at elevated temperatures sufficient to effect dimerization of the olefin, at least one acyclic internal monoolefin having from 4 to 20 carbon atoms per molecule, inclusive, said monoolefin being one of linear and branched and the branched monoolefin having branching at least one carbon atom removed from the internal double bond with a catalyst formed by mixing at least one of rare earth halides wherein said rare earth has atomic numbers of 57 through 71, inclusive, and yttrium halides with at least one alkali metal aluminum hydride, and recovering a product consisting essentially of dimers.

2. The method according to claim 1 wherein the halides are selected from the group consisting of chloride, bromide, and iodide, and the alkali metal is selected from the group consisting of lithium, sodium, potassium, rubidium, and cesium.

3. The method according to claim 1 wherein the dimerization is carried out in the presence of an inert diluent at a temperature of from about 200 to about 350° C.

4. The method according to claim 1 wherein said catalyst is formed by mixing cerous chloride and lithium aluminum hydride.

5. The process according to claim 4 wherein the catalyst is formed by mixing at a temperature in the range of from about 20 to about 300° C. using a mol ratio of cerous chloride to lithium aluminum hydride in the range of from about 0.1/1 to about 10/1, and the catalyst formation and dimerization reaction are both carried out in the presence of at least one material selected from the group consisting of aliphatic hydrocarbons, cycloaliphatic hydrocarbons, aromatic hydrocarbons, ethers, and trialkylamines wherein the aliphatic, cycloaliphatic, and aromatic hydrocarbons contain from 1 to 12 carbon atoms per molecule, inclusive, the ether contains from 2 to 8 carbon atoms per molecule, inclusive, and the trialkylamines contain from 3 to 12 carbon atoms per molecule, inclusive.

6. The process according to claim 2 wherein said catalyst is formed by mixing sodium aluminum hydride and praseodymium bromide.

7. The method according to claim 2 wherein said catalyst is formed by mixing potassium aluminum hydride and yttrium iodide.

References Cited

UNITED STATES PATENTS

| | | | |
|---|---|---|---|
| 2,871,276 | 1/1959 | Eiszner | 260—683.15 |
| 3,004,087 | 10/1961 | Goddard et al. | 260—683.15 |
| 3,179,647 | 4/1965 | Mulley et al. | 252—429 X |
| 3,341,619 | 9/1967 | Stogryn et al. | 260—683.15 |

PAUL M. COUGHLAN, JR., *Primary Examiner.*